US009693053B2

(12) United States Patent
Bandoh et al.

(10) Patent No.: US 9,693,053 B2
(45) Date of Patent: Jun. 27, 2017

(54) VIDEO ENCODING DEVICE, VIDEO DECODING DEVICE, VIDEO ENCODING METHOD, VIDEO DECODING METHOD, AND NON-TRANSITORY COMPUTER-READABLE RECORDING MEDIA THAT USE SIMILARITY BETWEEN COMPONENTS OF MOTION VECTOR

(75) Inventors: Yukihiro Bandoh, Yokosuka (JP); Shohei Matsuo, Yokosuka (JP); Seishi Takamura, Yokosuka (JP); Hirohisa Jozawa, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 384 days.

(21) Appl. No.: 14/124,331

(22) PCT Filed: Jun. 26, 2012

(86) PCT No.: PCT/JP2012/066282
§ 371 (c)(1),
(2), (4) Date: Dec. 6, 2013

(87) PCT Pub. No.: WO2013/002219
PCT Pub. Date: Jan. 3, 2013

(65) Prior Publication Data
US 2014/0105307 A1 Apr. 17, 2014

(30) Foreign Application Priority Data
Jun. 29, 2011 (JP) .................................. 2011-144122

(51) Int. Cl.
*H04N 19/503* (2014.01)
*H04N 19/105* (2014.01)
(Continued)

(52) U.S. Cl.
CPC ..... *H04N 19/00696* (2013.01); *H04N 19/463* (2014.11); *H04N 19/52* (2014.11); *H04N 19/91* (2014.11)

(58) Field of Classification Search
USPC ...................................................... 375/240.16
See application file for complete search history.

(56) References Cited

U.S. PATENT DOCUMENTS 6,658,157 B1 12/2003 Satoh et al.
6,738,428 B1* 5/2004 Nagatomo ........... H04B 14/068
375/244
(Continued)

FOREIGN PATENT DOCUMENTS

EP 2 321 904 A1 5/2011
EP 2 323 399 A2 5/2011
(Continued)

OTHER PUBLICATIONS

Ghandi et al: "A novel context modeling scheme for motion vectors context-based arithmetic coding", Electrical and Computer Engineering, 2004 Canadian Conference on Niagara Falls, Ont., Canada May 2-5, 2004, Piscataway, NJ, USA, IEEE, US, May 2, 2004 (May 2, 2004), p. 2021, XP010733656.*
(Continued)

*Primary Examiner* — Jamie Atala
*Assistant Examiner* — Patrick Demosky
(74) *Attorney, Agent, or Firm* — Harness, Dickey & Pierce P.L.C.

(57) ABSTRACT

A video encoding device uses motion-compensated interframe prediction by dividing an image into blocks, each block a predetermined size, designating a first component value of a plurality of component values of a motion vector (MV) between an encoding target block and a neighboring block, designating a second component value, and encoding
(Continued)

each first and second component values; a first component encoding means encodes a difference value of a first component and a second component encoding means, which obtains a probability of occurrence of a candidate value for the second component value of the MV of the encoding target block, based on a difference value between the first component value of the neighboring block MV and the first component value of the encoding target block MV and the second component value of the neighboring block MV, specifies a codeword of the second component value, encoding it based on the occurrence probability.

6 Claims, 15 Drawing Sheets

(51) Int. Cl.
    *H04N 19/51*     (2014.01)
    *H04N 19/52*     (2014.01)
    *H04N 19/463*    (2014.01)
    *H04N 19/91*     (2014.01)

(56) References Cited

U.S. PATENT DOCUMENTS

| | | | | |
|---|---|---|---|---|
| 6,785,331 | B1* | 8/2004 | Jozawa | H04L 25/497 375/240 |
| 7,365,659 | B1 | 4/2008 | Hoffmann et al. | |
| 7,936,818 | B2* | 5/2011 | Jayant | H04N 19/00 375/240.05 |
| 2003/0215014 | A1* | 11/2003 | Koto | H04N 19/105 375/240.16 |
| 2006/0023788 | A1* | 2/2006 | Otsuka | H04N 19/56 375/240.16 |
| 2007/0121727 | A1* | 5/2007 | Nakagawa | H04N 19/00587 375/240.16 |
| 2008/0089412 | A1* | 4/2008 | Ugur | H04N 19/597 375/240.12 |
| 2009/0123066 | A1* | 5/2009 | Moriya | H04N 19/139 382/166 |

FOREIGN PATENT DOCUMENTS

| | | |
|---|---|---|
| EP | 2 337 358 A1 | 6/2011 |
| JP | A-11-088890 | 3/1999 |
| JP | A-2000-138935 | 5/2000 |
| JP | A-2004-007775 | 1/2004 |
| JP | A-2008-283490 | 11/2008 |
| JP | 2009-055143 A | 3/2009 |
| KR | 10-2010-0019541 A | 2/2010 |
| RU | 2 323 541 C2 | 4/2008 |
| WO | 2008/082102 A1 | 7/2008 |
| WO | 2010/021699 A1 | 2/2010 |

OTHER PUBLICATIONS

Chang et al: "An Efficient Context Modeling Algorithm for Motion Vectors in CABAC", Signal Processing and Information Technology, 2007 IEEE International Symposium on, IEEE, Piscataway, NJ, USA, Dec. 15, 2007 (Dec. 15, 2007), pp. 796-800, XP031234239.*
Ghandi et al.: "A novel context modeling scheme for motion vectors context-based arithmetic coding", Electrical and Computer Engineering, 2004 Canadian Conference on Niagara Falls, Ont., Canada May 2-5, 2004, Piscataway, NJ, USA, IEEE, US, May 2, 2004 (May 2, 2004), p. 2021, XP010733656.*
Chang et al.: "An Efficient Context Modeling Algorithm for Motion Vectors in CABAC", Signal Processing and Information Technology, 2007 IEEE International Symposium on, IEEE, Piscataway, NJ, USA, Dec. 15, 2007 (Dec. 15, 2007), pp. 796-8000, XP031234239.*
Ghandi, Mahmoud, et al., "A Novel Context Modeling Scheme for Motion Vectors Context-based Arithmetic Coding," Canadian Conference on Electrical and Computer Engineering, Niagara Falls, Canada, May 2-5, 2004, pp. 2021-2024.
Sun, Chang, et al., "An Efficient Context Modeling Algorithm for Motion Vectors in CABAC," 2007 IEEE International Symposium on Signal Processing and Information Technology, Dec. 15, 2007, pp. 796-800.
Marpe, Detlev, et al., "Video Compression Using Context-based Adaptive Arithmetic Coding," Proceedings of 2001 International Conference on Image Processing, Thessaloniki, Greece, Oct. 7-10, 2001, vol. 3, pp. 558-561.
Search Report, European Patent Application No. 12805372.5, Oct. 29, 2014.
Office Action, Taiwanese Patent Application No. 101122950, Jun. 25, 2015.
Shinya Kadono, et al., "H.264/AVC Textbook: 3rd Revised Edition", Impress R&D, pp. 128-130, 2009, with partial translation thereof.
International Search Report for PCT/JP2012/066282 mailed Sep. 18, 2012 with English translation.
Notice of Allowance, Korean Patent Application No. 10-2013-7031984, Oct. 28, 2015.
Decision on Grant, Russian Patent Application No. 2013154757, Jul. 3, 2015.
Office Action, Chinese Patent Application No. 201280028607.X, May 3, 2016.

* cited by examiner

ENCODING TARGET IMAGE

VIDEO ENCODING DEVICE, VIDEO DECODING DEVICE, VIDEO ENCODING METHOD, VIDEO DECODING METHOD, AND NON-TRANSITORY COMPUTER-READABLE RECORDING MEDIA THAT USE SIMILARITY BETWEEN COMPONENTS OF MOTION VECTOR

CROSS-REFERENCE TO RELATED APPLICATIONS

This application is a 371 U.S. National Stage of International Application No. PCT/JP2012/066282, filed Jun. 26, 2012, which claims priority to Japanese Patent Application No. 2011-144122, filed Jun. 29, 2011, the contents of both of which are incorporated herein by reference.

TECHNICAL FIELD

The present invention relates to a video encoding device, a video decoding device, a video encoding method, a video decoding method, a video encoding program, and a video decoding program using video encoding technology that uses motion compensation.

BACKGROUND ART

One of important element technologies in video encoding represented by the standard H.264 is motion-compensated inter-frame prediction. In order to efficiently encode a motion vector (MV) in motion-compensated inter-frame prediction, predictive encoding of the MV is performed (for example, see Non-Patent Document 1). FIG. 13 is a block diagram illustrating the configuration of a video encoding device using motion compensation according to the related art. In FIG. 13, an encoding unit 300 based on the motion compensation performs encoding based on the motion compensation. A motion estimation unit 310 estimates the motion of an image through a motion search. A MV storage unit 320 stores a MV calculated through the motion estimation.

A MV prediction unit 330 predicts a MV from encoded MV prediction information for MV prediction coding. A reference block MV extraction unit 331 extracts a MV of a reference block for use in prediction of the MV A median calculation unit 332 calculates the median of the MV extracted from the reference block. A prediction residual calculation unit 340 calculates the difference between the MV and a predicted MV (hereinafter referred to as a predicted vector). A code allocation unit 350 outputs an encoded stream by allocating a variable length code to a quantized transform coefficient or a prediction residual signal (referred to as a prediction error vector) of the MV.

When a video signal of the encoding target block is input, the motion estimation unit 310 performs a motion search by matching the input video signal against a decoded signal of an encoded reference image, and calculates a MV The calculated MV is input to the encoding unit 300 based on the motion compensation. In the encoding unit 300 based on the motion compensation, a residual signal between the video signal and the predicted signal is obtained through motion compensation using the MV and encoded by an orthogonal transform, quantization, or the like. A quantized value of a processing result or the like is encoded by the code allocation unit 350 and the encoded quantized value is output as an encoded stream. On the other hand, predictive encoding is also performed to reduce the code bit amount for the MV.

Because of this, the MV calculated by the motion estimation unit 310 is stored in a MV storage unit 320 for reference in the future. The MV prediction unit 330 calculates a predicted vector using an encoded MV.

In prediction of the MV in the MV prediction unit 330, first, the reference block MV extraction unit 331 extracts MVs from the MV storage unit 320 by designating encoded blocks in the vicinity of a prediction target block (encoding target block) B0 of an encoding target image (also referred to as an encoding target picture or frame) illustrated in FIG. 14 as reference blocks B1 to B3. FIG. 14 is a diagram illustrating an example of the prediction target block of the encoding target image.

Next, the median calculation unit 332 calculates medians of MV components of the reference blocks B1 to B3, and generates a predicted vector from the calculated medians. A predicted vector generation method is referred to as spatial median prediction. The prediction residual calculation unit 340 calculates a difference (prediction error vector) between the MV and the predicted MV, and transmits the prediction error vector to the code allocation unit 350. The prediction error vector is encoded by the code allocation unit 350 at a variable length, and the encoded prediction error vector is output as an encoded stream.

FIG. 15 is a block diagram illustrating the configuration of a video decoding device using motion compensation of the related art. In FIG. 15, a variable length decoding unit 400 decodes a variable length code of the encoded stream. A MV calculation unit 410 adds a prediction error vector to a predicted vector. A MV storage unit 420 stores the MV. A MV prediction unit 430 predicts the MV using decoded information. A reference block MV extraction unit 431 extracts the MV of the reference block for use in the prediction of the MV. A median calculation unit 432 calculates a median of a MV component extracted from the reference block. A decoding unit 440 based on motion compensation performs the motion compensation using the calculated MV, and outputs a decoded video signal by decoding a decoding target block.

When the encoded stream is input, the variable length decoding unit 400 decodes a variable length code of the encoded stream, transmits a quantized transform coefficient of the decoding target block to the decoding unit 440 based on the motion compensation, and transmits the prediction error vector to the MV calculation unit 410. The MV calculation unit 410 adds the prediction error vector to a predicted vector obtained from the decoded MV, and calculates the MV. The calculated MV is transmitted to the decoding unit 440 based on the motion compensation and stored in the MV storage unit 420. The decoding unit 440 based on the motion compensation performs the motion compensation using the calculated MV, and outputs a decoded video signal by decoding a decoding target block.

A MV prediction process of the MV prediction unit 430 in the video decoding device is substantially the same as the process of the MV prediction unit 330 in the video encoding device illustrated in FIG. 13. FIG. 16 is a block diagram illustrating a configuration of a time direction MV prediction unit of the related art.

In encoding according to the standard H.264, as one of encoding modes in encoding of a B picture, an encoding mode which is referred to as a direct mode in which motion information is predicted and generated from motion information of an encoded block and in which encoding of the motion information is omitted is used. The direct mode includes a spatial direct mode mainly using motion information of a space direction and a temporal direct mode mainly using motion information of a time direction. In prediction of the MV in the temporal direct mode, a MV prediction unit 500 calculates a predicted vector as follows.

An anchor block MV extraction unit 501 extracts a MV mvCol of a block (referred to as anchor block) at the same position as a prediction target block in an anchor picture from a MV storage unit 510. The anchor picture is a picture having a MV when the MV of the direct mode is obtained. Normally, the anchor picture is a rear reference picture closest to the encoding target picture in the order of display. Next, an extrapolation prediction unit 502 calculates a MV mvL0 of L0 and a MV mvL1 of L1 from the MV mvCol through proportional distribution according to time intervals of a reference picture of L0, an encoding target picture, and an anchor picture.

Also, because it is possible to select a maximum of two pictures from an arbitrary reference picture in the B picture, the two pictures are discriminated as L0 and L1, prediction to be mainly used in a forward direction is referred to as L0 prediction, and prediction to be mainly used in a backward direction is referred to as L1 prediction. The MV prediction unit 500 outputs the MVs mvL0 and mvL1 calculated by the extrapolation prediction unit 502 as predicted vectors. In addition, there is a method of designating the MV mvCol as the predicted vector. A predicted vector generation method is referred to as co-located prediction.

DOCUMENTS OF THE PRIOR ART

Non-Patent Document

Non-Patent Document 1

H.264/AVC textbook (third revised edition), Sumino Shinya, et al., Impress R&D, pp. 128 to 130, 2008.

DISCLOSURE OF INVENTION

Problems to Be Solved by the Invention

Incidentally, in MV encoding according to the video encoding device using the motion compensation in the related art, there is a problem in that a predicted vector is generated from a MV of a spatial neighboring block, a difference vector between the predicted vector and a MV of an encoding target block is designated as an encoding target, and a horizontal component and a vertical component of the MV are simultaneously predicted. When encoding is performed in the order of the horizontal component and the vertical component of the MV (as well as when encoding is performed in the order of the vertical component and the horizontal component), generated encoded data is decoded in the order of the horizontal component and the vertical component in a decoding side. Because of this, an already decoded horizontal component is available when the vertical component of the MV is decoded. In addition, because MV encoding is lossless encoding, the horizontal component of the MV available in the decoding side is the same as a value encoded by an encoding side.

However, because each component of the MV is independently predicted and encoded in the MV encoding of the related art, it is difficult to sufficiently use a correlation between components of the MV. Because of this, there is a need for improvement in the efficiency of MV encoding.

The present invention has been made in view of such circumstances, and an object of the invention is to provide a video encoding device, a video encoding method, and a video encoding program capable of improving the efficiency of MV encoding and further reducing a bit amount of a MV by more than the related art, and a video decoding device, a video decoding method, and a video decoding program used to decode an image encoded by the video encoding device, the video encoding method, and the video encoding program.

Means for Solving the Problem

According to the present invention, there is provided a video encoding device using motion-compensated inter-frame prediction for each block by dividing an image into blocks each having a predetermined size, designating one component value of a plurality of component values of a MV between an encoding target block and a neighboring block as a first component value, designating another component value as a second component value, and encoding each of the first component value and the second component value, the video encoding device including: a first component encoding means which obtains a difference value of a first component, which is a difference value between a predicted value of the first component value of the MV of the encoding target block generated from the first component value of the MV of the neighboring block and the first component value of the MV of the encoding target block, and encodes the difference value of the first component; and a second component encoding means which obtains a probability of occurrence of a candidate value for a second component value of the MV of the encoding target block based on a difference value between the first component value of the MV of the neighboring block and the first component value of the MV of the encoding target block and the second component value of the MV of the neighboring block, specifies a codeword of the second component value based on the occurrence probability, and encodes the second component value.

According to the present invention, there is provided a video decoding device which decodes an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, the video decoding device including: a first component decoding means which generates the first component value by decoding a difference value of a first component and adding thereto a predicted value of the first component value of the MV of the encoding target block generated from the first component value of the MV of the neighboring block ; and a second component decoding means which obtains a probability of occurrence of a candidate value for the second component value of the MV of the encoding target block based on a difference value between the first component value of the MV of the neighboring block and the first component value of the MV of the encoding target block and the second component value of the MV of the neighboring block, identifies a correspondence relationship between the second component value and a codeword of the second component value based on the occurrence probability, and decodes the codeword of the second component value given as encoded data to the second component value.

According to the present invention, there is provided a video encoding method using motion-compensated interframe prediction for each block by dividing an image into blocks each having a predetermined size, designating one component value of a plurality of component values of a MV between an encoding target block and a neighboring block as a first component value, designating another component value as a second component value, and encoding each of the first component value and the second component value, the video encoding method including: a first component encoding step of obtaining a difference value of a first component, which is a difference value between a predicted value of the first component value of the MV of the encoding target block generated from the first component value of the MV of the neighboring block and the first component value of the MV of the encoding target block, and encoding the difference value of the first component; and a second component encoding step of obtaining a probability of occurrence of a candidate value for a second component value of the MV of the encoding target block based on a difference value between the first component value of the MV of the neighboring block and the first component value of the MV of the encoding target block and the second component value of the MV of the neighboring block, specifying a codeword of the second component value based on the occurrence probability, and encoding the second component value.

According to the present invention, there is provided a video decoding method of decoding an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, the video decoding method including: a first component decoding step of generating the first component value by decoding a difference value of a first component and adding a predicted value of the first component value of the MV of the encoding target block generated from the first component value of the MV of the neighboring block to the difference value of the first component; and a second component decoding step of obtaining a probability of occurrence of a candidate value for the second component value of the MV of the encoding target block based on a difference value between the first component value of the MV of the neighboring block and the first component value of the MV of the encoding target block and the second component value of the MV of the neighboring block, identifying a correspondence relationship between the second component value and a codeword of the second component value based on the occurrence probability, and decoding the codeword of the second component value given as encoded data to the second component value.

According to the present invention, there is provided a video encoding program used to cause a computer on a video encoding device, which uses motion-compensated inter-frame prediction for each block by dividing an image into blocks each having a predetermined size, designating one component value of a plurality of component values of a MV between an encoding target block and a neighboring block as a first component value, designating another component value as a second component value, and encoding each of the first component value and the second component value, to perform an image encoding process including: a first component encoding step of obtaining a difference value of a first component, which is a difference value between a predicted value of the first component value of the MV of the encoding target block generated from the first component value of the MV of the neighboring block and the first component value of the MV of the encoding target block, and encoding the difference value of the first component; and a second component encoding step of obtaining a probability of occurrence of a candidate value for a second component value of the MV of the encoding target block based on a difference value between the first component value of the MV of the neighboring block and the first component value of the MV of the encoding target block and the second component value of the MV of the neighboring block, specifying a codeword of the second component value based on the occurrence probability, and encoding the second component value.

According to the present invention, there is provided a video decoding program used to cause a computer on a video decoding device which decodes an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, to perform a video decoding process including: a first component decoding step of generating the first component value by decoding a difference value of a first component and adding a predicted value of the first component value of the MV of the encoding target block generated from the first component value of the MV of the neighboring block to the difference value of the first component; and a second component decoding step of obtaining a probability of occurrence of a candidate value for the second component value of the MV of the encoding target block based on a difference value between the first component value of the MV of the neighboring block and the first component value of the MV of the encoding target block and the second component value of the MV of the neighboring block, identifying a correspondence relationship between the second component value and a codeword of the second component value based on the occurrence probability, and decoding the codeword of the second component value given as encoded data to the second component value.

Effects of the Invention

According to the video encoding device associated with the embodiment of the present invention, there is an advantageous effect in that a generated encoding bit amount in a video encoding process can be reduced because a bit amount of a MV can be reduced.

EMBODIMENTS FOR CARRYING OUT THE INVENTION

Figure 1:
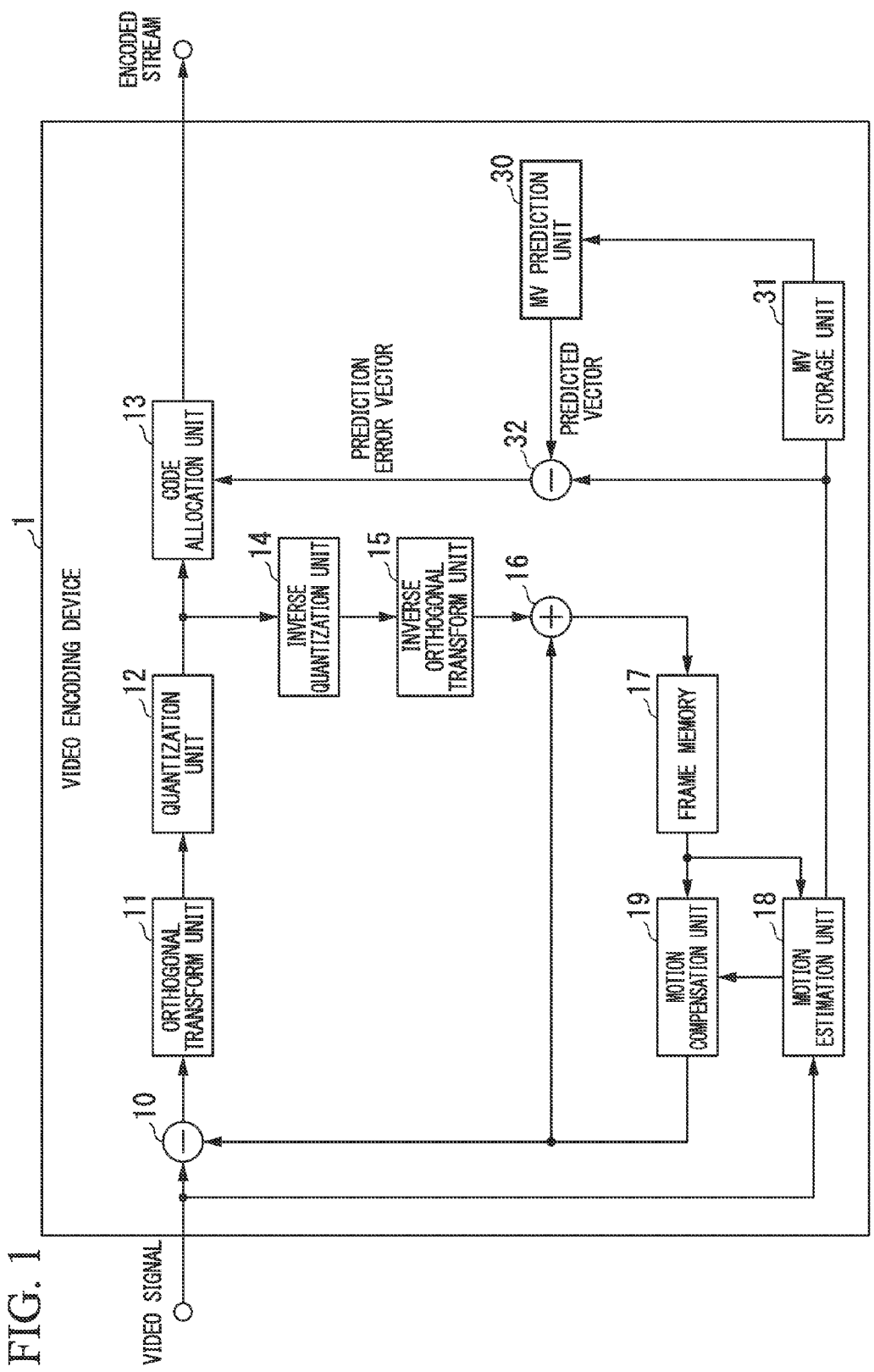
FIG. 1 is a block diagram illustrating a configuration of a video encoding device in an embodiment of the present invention.

Hereinafter, a video encoding device and a video decoding device according to an embodiment of the present invention will be described with reference to the drawings. FIG. 1 is a block diagram illustrating a configuration of the video encoding device in the embodiment of the present invention. In this embodiment, the video encoding device 1 has a MV prediction unit 30 as a part different from the related art, and the other parts are the same as those of a configuration of a general video encoding device of the related art used as encoders of the standard H.264 and others. The video encoding device 1 receives an input of a video signal to be encoded, encodes each block by dividing a frame of the input video signal into blocks, and outputs a bit stream as an encoded stream. For this encoding, a prediction residual signal calculation unit 10 obtains a difference between the input video signal and a predicted signal, which is an output of a motion compensation unit 19, and outputs the difference as a prediction residual signal. An orthogonal transform unit 11 performs an orthogonal transform such as a discrete cosine transform (DCT) on the prediction residual signal, and outputs a transform coefficient. A quantization unit 12 quantizes a transform coefficient and outputs the quantized transform coefficient. A code allocation unit 13 performs entropy encoding on the quantized transform coefficient and outputs an entropy encoding result as an encoded stream.

On the other hand, the quantized transform coefficient is also input to an inverse quantization unit 14 and inversely quantized here. An inverse orthogonal transform unit 15 performs an inverse orthogonal transform on a transform coefficient, which is an output of the inverse quantization unit 14, and outputs a prediction residual-decoded signal. A decoded signal calculation unit 16 adds the prediction residual-decoded signal to the predicted signal, which is an output of a motion compensation unit 19, and generates a decoded signal of an encoded encoding target block. The decoded signal is stored in a frame memory 17 so that the decoded signal is used as a reference image of motion compensation in the motion compensation unit 19. A motion estimation unit 18 performs a motion search by referring to the reference image stored in the frame memory 17 with respect to the video signal of the encoding target block, and calculates a MV. The MV is output to the motion compensation unit 19 and the prediction error vector calculation unit 32, and is stored in a MV storage unit 31. The motion compensation unit 19 outputs the predicted signal of the encoding target block by referring to an image within the frame memory 17 using the MV obtained by the motion estimation unit 18.

In order to perform prediction encoding on a MV used in motion compensation, the MV is predicted using information encoded by the MV prediction unit 30, a difference between the MV used in the motion compensation and the predicted MV (referred to as a predicted vector) is calculated by a prediction error vector calculation unit 32, and a result is output to the code allocation unit 13 as a prediction error vector. The code allocation unit 13 also allocates a code to the prediction error vector through entropy encoding, and outputs an allocation result as an encoded stream.

Figure 2:
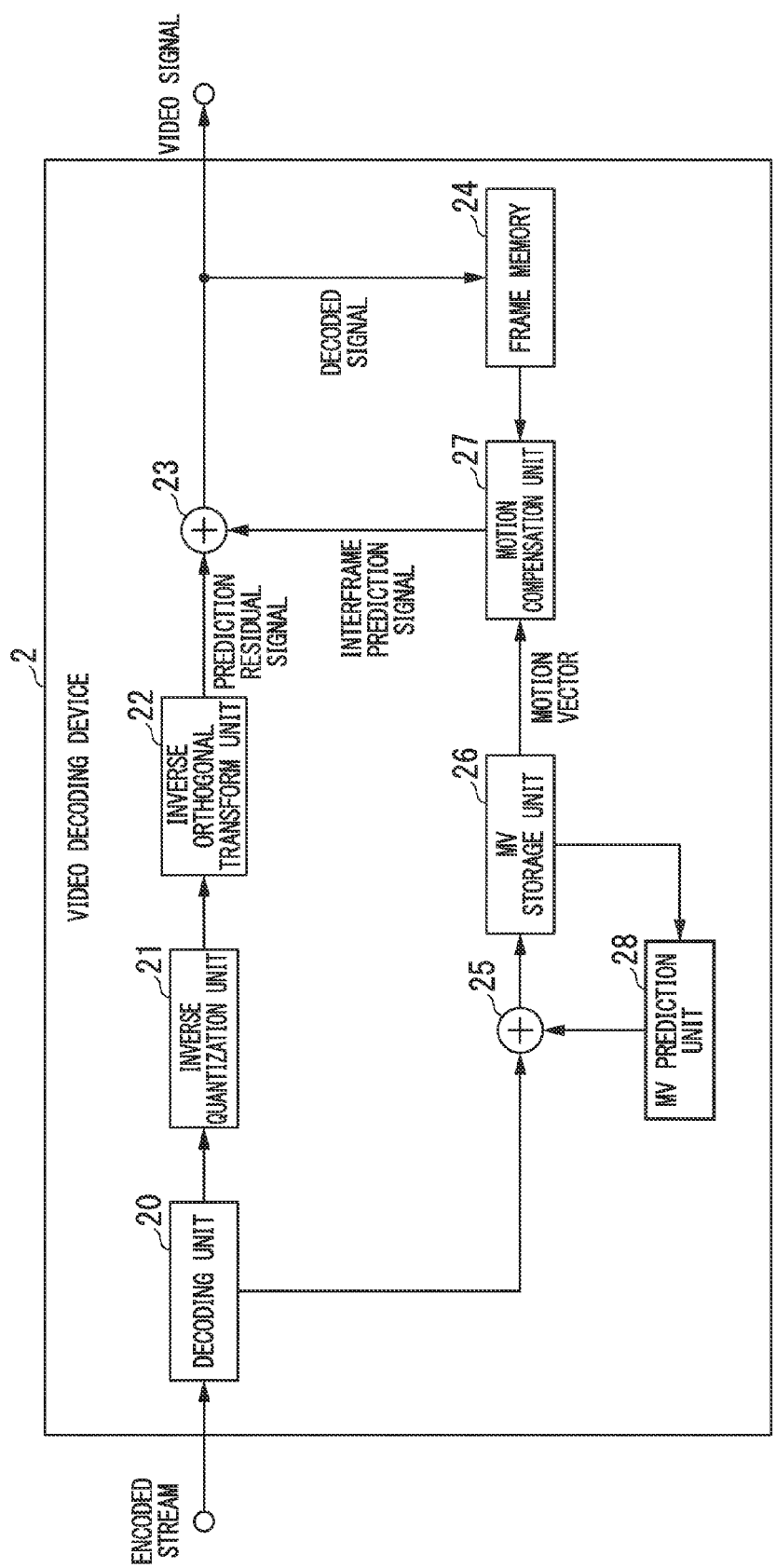
FIG. 2 is a block diagram illustrating a configuration of a video decoding device in an embodiment of the present invention.

FIG. 2 is a block diagram illustrating a configuration of a video decoding device in an embodiment of the present invention.

The video decoding device 2 has a MV prediction unit 28 as a part different from the related art, and the other parts are the same as those of a configuration of a general video decoding device of the related art used as decoders of the standard H.264 and others. The video decoding device 2 outputs a video signal of a decoded image by receiving and decoding an input of an encoded stream encoded by the video encoding device 1 illustrated in FIG. 1. For this decoding, a decoding unit 20 receives the input of the encoded stream, performs entropy decoding on a quantized transform coefficient of a decoding target block, and decodes a prediction error vector.

An inverse quantization unit 21 outputs a decoded transform coefficient by receiving an input of a quantized transform coefficient and performing inverse quantization on the quantized transform coefficient. An inverse orthogonal transform unit 22 performs an inverse orthogonal transform on the decoded transform coefficient and outputs a decoded prediction error signal. A decoded signal calculation unit 23 generates a decoded signal of a decoding target block by adding an inter-frame prediction signal generated by a motion compensation unit 27 to the decoded prediction residual signal. The decoded signal is output to an external device such as a display device, and is stored in a frame memory 24 so that the decoded signal is used as a reference image of motion compensation in the motion compensation unit 27.

A MV calculation unit 25 adds the prediction error vector decoded by the decoding unit 20 to the predicted vector calculated by the MV prediction unit 28, and calculates a MV to be used in motion compensation. The MV is stored in a MV storage unit 26 and reported to the motion compensation unit 27. The motion compensation unit 27 performs motion compensation based on the input MV, and generates an inter-frame prediction signal of the decoding target block by referring to the reference image of the frame memory 24.

The inter-frame prediction signal is added to the decoded prediction residual signal in the decoded signal calculation unit 23. The MV prediction unit 28 predicts the MV using the decoded MV stored in the MV storage unit 26 and outputs the obtained predicted vector to the MV calculation unit 25.

Next, the MV prediction unit 30 illustrated in FIG. 1 and the MV prediction unit 28 illustrated in FIG. 2 will be described. The two MV prediction units 30 and 28 have similar configurations and processing operations. In the following description, two components of the MV are referred to as a first component and a second component in the order of encoding. For example, when the encoding is performed in the order of a horizontal component and a vertical component, the horizontal component is the first component and the vertical component is the second component. The video encoding device in the present invention encodes the second component using the first component of the MV. Hereinafter, a description will be given by designating the horizontal component and the vertical component of the MV as the first component and the second component, respectively. However, the first component and the second component may be reversely allocated.

Figure 11:
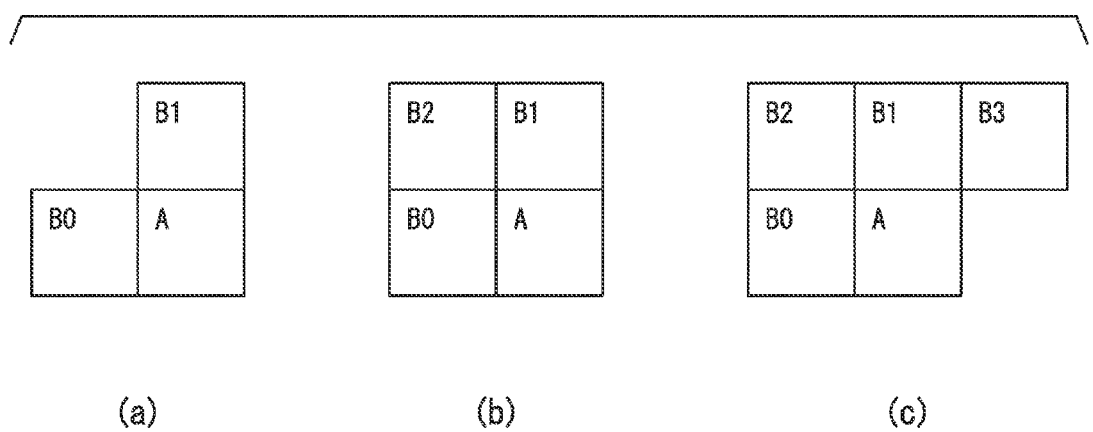
FIG. 11 is an explanatory diagram illustrating an example in which a neighboring block is set.

To begin, the principle of processing operations of the MV prediction units 30 and 28 will be briefly described. First, M neighboring blocks are set to encode a target block. An example in which the neighboring blocks are set is illustrated in FIGS. 11(*a*), 11(*b*), and 11(*c*). FIGS. 11(*a*), 11(*b*), and 11(*c*) are examples in which two neighboring blocks (blocks B0 and B1), three neighboring blocks (blocks B0, B1, and B2), and four neighboring blocks (blocks B0, B1, B2, and B3) are set for a block A. Also, the neighboring blocks are not limited to the examples of the same drawings. It is possible to increase or decrease the number of neighboring blocks. The MV is assigned to the encoded target block and the neighboring block. It is assumed that the MV of the encoding target block is $(v_x, v_y)$ and the MV of an $m^{th}$ neighboring block is $(u_x^{(m)}, u_y^{(m)})$. Also, $m = 0, \ldots, M-1$.

A difference value in the first component of the MV is obtained between the encoding target block and the neighboring block. This is referred to as a first component difference value. A set of first component difference values is as follows.

$$E_x = (e_x^{(0)}, \ldots, e_x^{(M-1)})$$

Here, $e_x^{(m)} = v_x - u_x^{(m)}$. A magnitude of the first component difference value represents similarity of first components of the corresponding neighboring block and the encoding target block, and similar similarity is also expected to be established for the second component.

Accordingly, based on the first component difference value, a probability of occurrence of the second component is estimated as in the following expression.

$$p(x) = A \sum_{m=0}^{M-1} \frac{1}{e_x^{(m)}} f(x - u_y^{(m)}, q, \lambda) \quad (1)$$

Here, A is a constant for normalization so that a sum is set to 1 for x of p(x). In addition, f( ) uses the following generalized Gaussian distribution.

$$f(x, q, \lambda) = \frac{\lambda \cdot q}{2\Gamma\left(\frac{1}{q}\right)} e^{-(\lambda \cdot |x|)^q}$$

Here, q is a parameter representing the shape of a distribution, and λ is a parameter associated with the variance of the distribution. In addition, Γ(z) is a gamma function defined in Expression (2).

$$\Gamma(z) = \int_0^\infty t^{z-1} e^{-t} dt, \ z > 0 \quad (2)$$

$f(x - u_y^{(m)})$ has a maximum value in $u_y^{(m)}$, and its value is decreased according to separation from $u_y^{(m)}$. A weighted sum obtained by weighting $f(x - u_y^{(m)})$ by a reciprocal of the first component difference value is Expression (1). That is, a large value of p(x) is assigned in the vicinity of $u_y^{(m)}$ in which the first component difference value is small. Based on Expression (1), the occurrence probability is sorted in descending order, and a value after sorting is transformed into a binary number using a given code table. As an example of the code table, it is possible to apply a Golomb code or an Exp-Golomb code.

Figure 3:
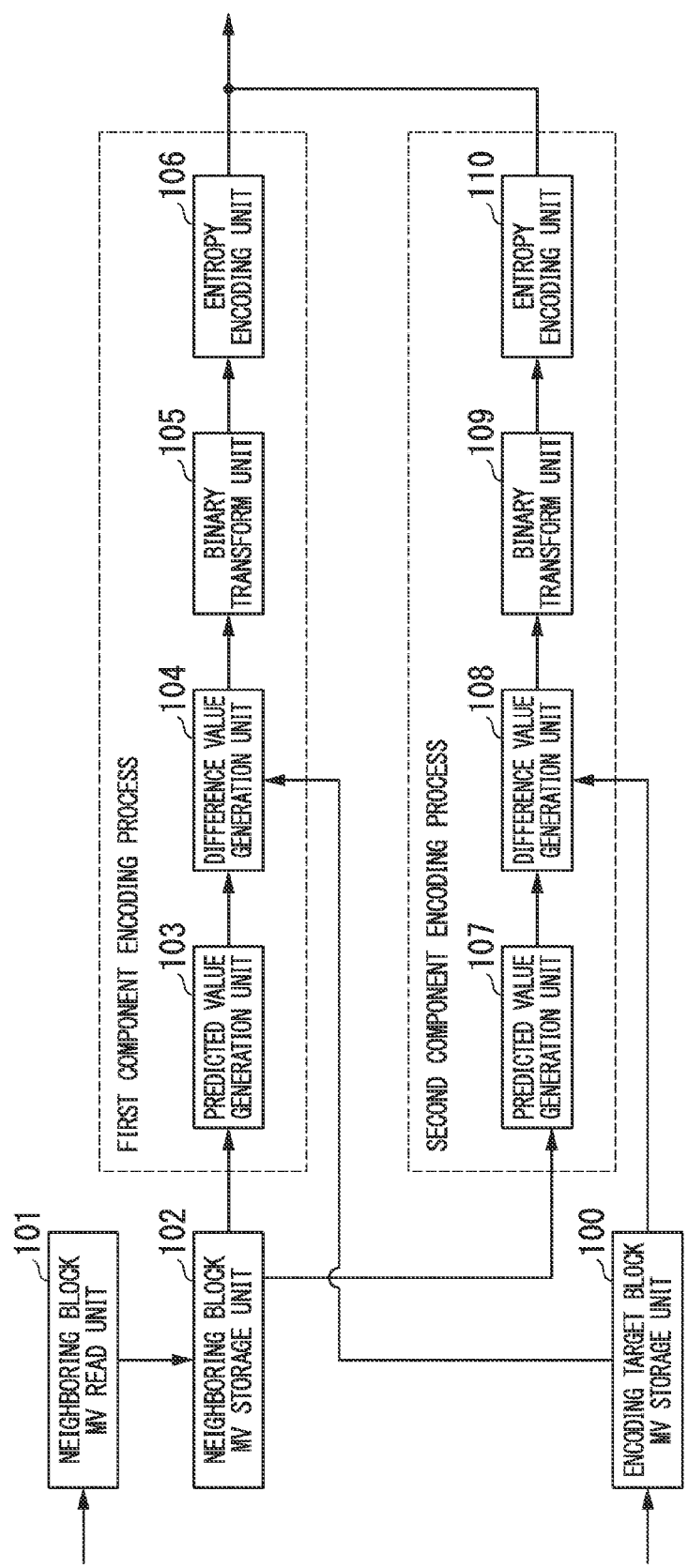
FIG. 3 is a block diagram illustrating a configuration of a MV prediction unit illustrated in FIG. 1.

Next, a configuration of the MV prediction unit 30 illustrated in FIG. 1 will be described with reference to FIG. 3. FIG. 3 is a block diagram illustrating the configuration of the MV prediction unit 30 illustrated in FIG. 1. In FIG. 3, an encoding target block MV storage unit 100 stores a first component of a MV of an encoding target block and a predicted value for the first component. A neighboring block MV read unit 101 reads a MV of a designated neighboring block. A neighboring block MV storage unit 102 stores the MV of the neighboring block. A predicted value generation unit 103 receives an input of the first component of the MV of the neighboring block and generates a predicted value for the first component of the MV of the encoding target block. A predicted value generation method is assumed to be given in advance. For example, it is possible to apply spatial median prediction.

A difference value generation unit 104 receives inputs of the first component of the MV of the encoding target block stored in the encoding target block MV storage unit 100 and the predicted value for the first component output from the predicted value generation unit 103, and outputs a difference value between the two. A binary transform unit 105 transforms the difference value output from the difference value generation unit 104 into a binary sequence.

A specific transform into the binary sequence is assumed to be given during encoding. For example, a Golomb code or an exponential (Exp)-Golomb code is used. Reference sign 106 denotes an entropy encoding unit which performs entropy encoding on a binary sequence output from the binary transform unit 105. Specific entropy encoding is assumed to be given during encoding. For example, context-adaptive binary arithmetic coding (CABAC) adopted in H.264/advanced video coding (AVC) is used.

A predicted value generation unit 107 receives an input of the second component of the MV of the neighboring block, and generates a predicted value for the second component of the MV of the encoding target block. A predicted value generation method is assumed to be given in advance. For example, it is possible to apply spatial median prediction.

A difference value generation unit 108 receives inputs of the second component of the MV of the encoding target block stored in the encoding target block MV storage unit 100 and the predicted value for the second component output from the predicted value generation unit 107, and outputs a difference value between the two. A binary transform unit 109 transforms the difference value output from the difference value generation unit 108 into a binary sequence. A specific transform into the binary sequence is assumed to be given during encoding. For example, a Golomb code or an Exp-Golomb code is used. An entropy encoding unit 110 performs entropy encoding on a binary sequence output from the binary transform unit 109. Specific entropy encoding is assumed to be given during encoding. For example, CABAC adopted in H.264/AVC is used.

Figure 4:
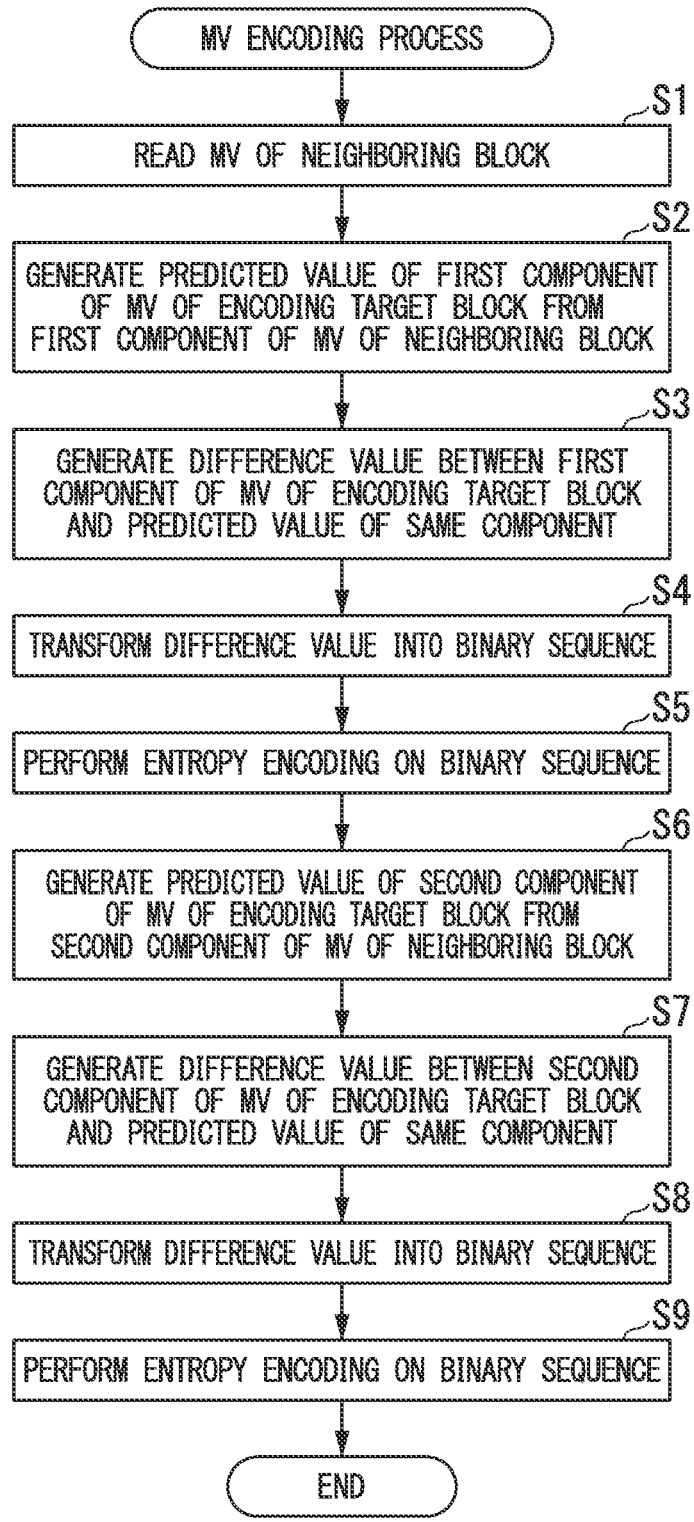
FIG. 4 is a flowchart illustrating a processing operation of a vector prediction unit illustrated in FIG. 3.

Next, a processing operation of the vector prediction unit 30 illustrated in FIG. 3 will be described with reference to FIG. 4. FIG. 4 is a flowchart illustrating the processing operation of the vector prediction unit 30 illustrated in FIG. 3. First, the predicted value generation unit 103 reads a MV of a designated neighboring block (step S1), and generates a predicted value for the first component of the MV of the encoding target block from the first component of the MV of the neighboring block (step S2). A predicted value generation method is assumed to be given in advance. For example, it is possible to apply the above-described spatial median prediction.

Next, the difference value generation unit 104 generates a difference value between two from the first component of the MV of the encoding target block and a predicted value of the same component (step S3). Subsequently, the binary transform unit 105 transforms the generated difference value into a binary sequence (step S4). A specific transform into the binary sequence is assumed to be given during encoding. For example, a Golomb code or an Exp-Golomb code is used. The entropy encoding unit 106 performs entropy encoding on the binary sequence and outputs a result of the entropy encoding (step S5). Specific entropy encoding is assumed to be given during encoding. For example, CABAC adopted in H.264/AVC is used.

In parallel with this operation, the predicted value generation unit 107 reads the MV of the designated neighboring block, and generates a predicted value for the second component of the MV of the encoding target block from the second component of the MV of the neighboring block (step S6). A predicted value generation method is assumed to be given in advance. For example, it is possible to apply the above-described spatial median prediction.

Next, the difference value generation unit 108 generates a difference value between two from the second component of the MV of the encoding target block and a predicted value of the same component (step S7). Subsequently, the binary transform unit 109 transforms the generated difference value into a binary sequence (step S8). A specific transform into the binary sequence is assumed to be given during encoding. For example, a Golomb code or an Exp-Golomb code is used. The entropy encoding unit 110 performs entropy encoding on the binary sequence and outputs a result of the entropy encoding (step S9). Specific entropy encoding is assumed to be given during encoding. For example, CABAC adopted in H.264/AVC is used.

Figure 5:
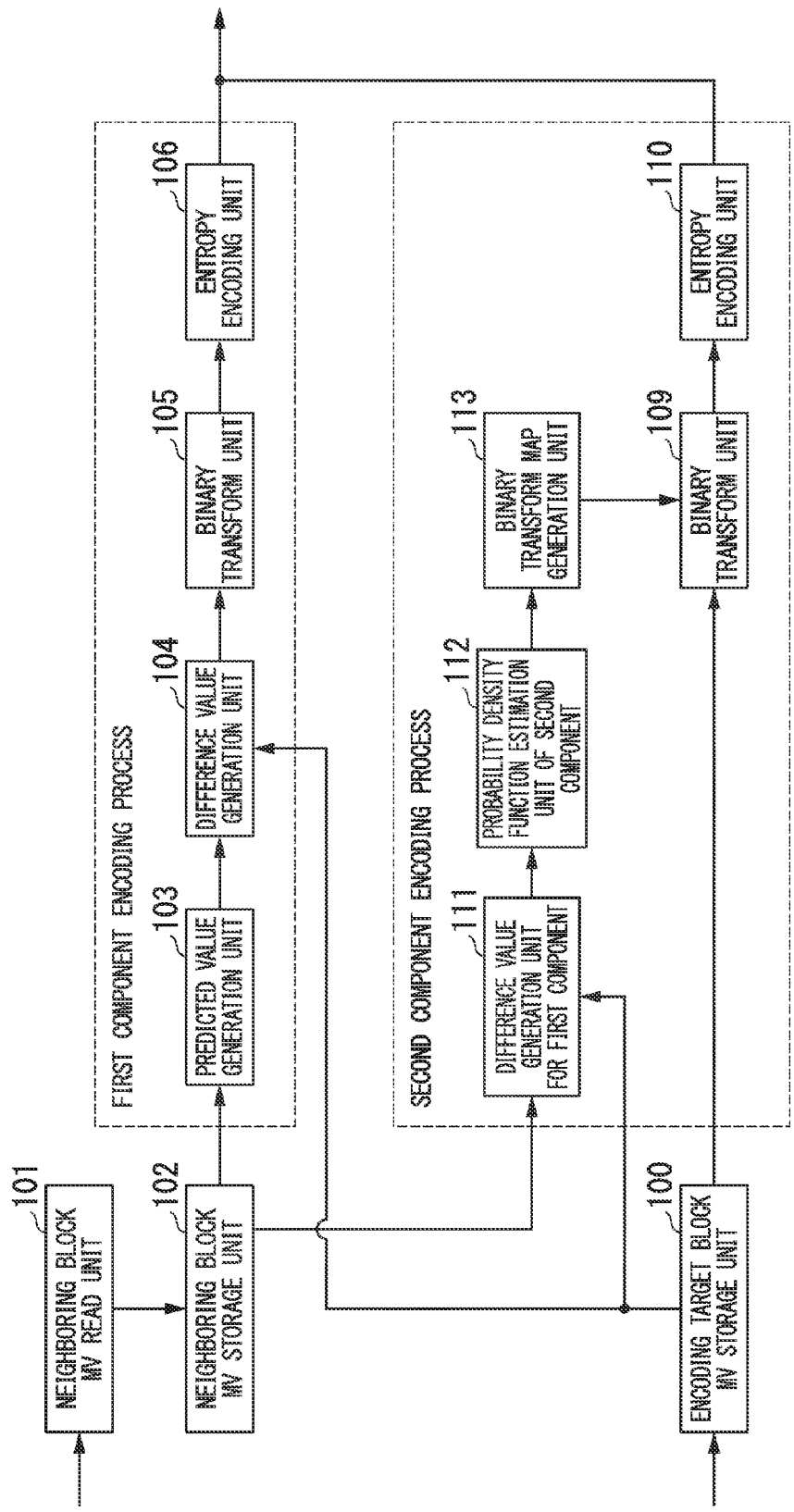
FIG. 5 is a block diagram illustrating a configuration produced by modifying the vector prediction unit illustrated in FIG. 3.

Next, a configuration produced by modifying the vector prediction unit 30 illustrated in FIG. 3 will be described with reference to FIG. 5. FIG. 5 is a block diagram illustrating the configuration produced by modifying the vector prediction unit 30 illustrated in FIG. 3.

The same parts as those of the device illustrated in FIG. 3 are assigned the same reference signs in FIG. 5, and description thereof is omitted. The device illustrated in FIG. 5 is different from the device illustrated in FIG. 3 in that a difference value generation unit 111 for the first component, a probability density function estimation unit 112 of the second component, and a binary transform map generation unit 113 are provided.

The difference value generation unit 111 for the first component reads the first component of the MV of each neighboring block stored in the neighboring block MV storage unit 102 and the first component of the MV of the encoding target block stored in the encoding target block MV storage unit 100, and outputs a difference value of the first component of the MV of each neighboring block for the first component of the MV of the encoding target block. The probability density function estimation unit 112 of the second component outputs the probability density function of the second component of the MV of the encoding target block according to Expression (1) from the output difference value and the second component of the MV of each neighboring block. In addition, parameters q and γ used to prescribe a generalized Gaussian distribution are assumed to be given from the outside.

The binary transform map generation unit 113 sorts candidate values for the second component of the MV of the encoding target block in descending order according to probability of occurrence using the output probability density function, and obtains rankings within all candidate vectors for the second component of the MV of the encoding target block. The binary transform unit 109 receives an input of a ranking for the second component of the MV obtained in the binary transform map generation unit 113, and transforms the same ranking into a binary number. Specific allocation of the binary sequence for a value of the same ranking is assumed to be given during encoding. For example, a Golomb code or an Exp-Golomb code is used.

Figure 6:
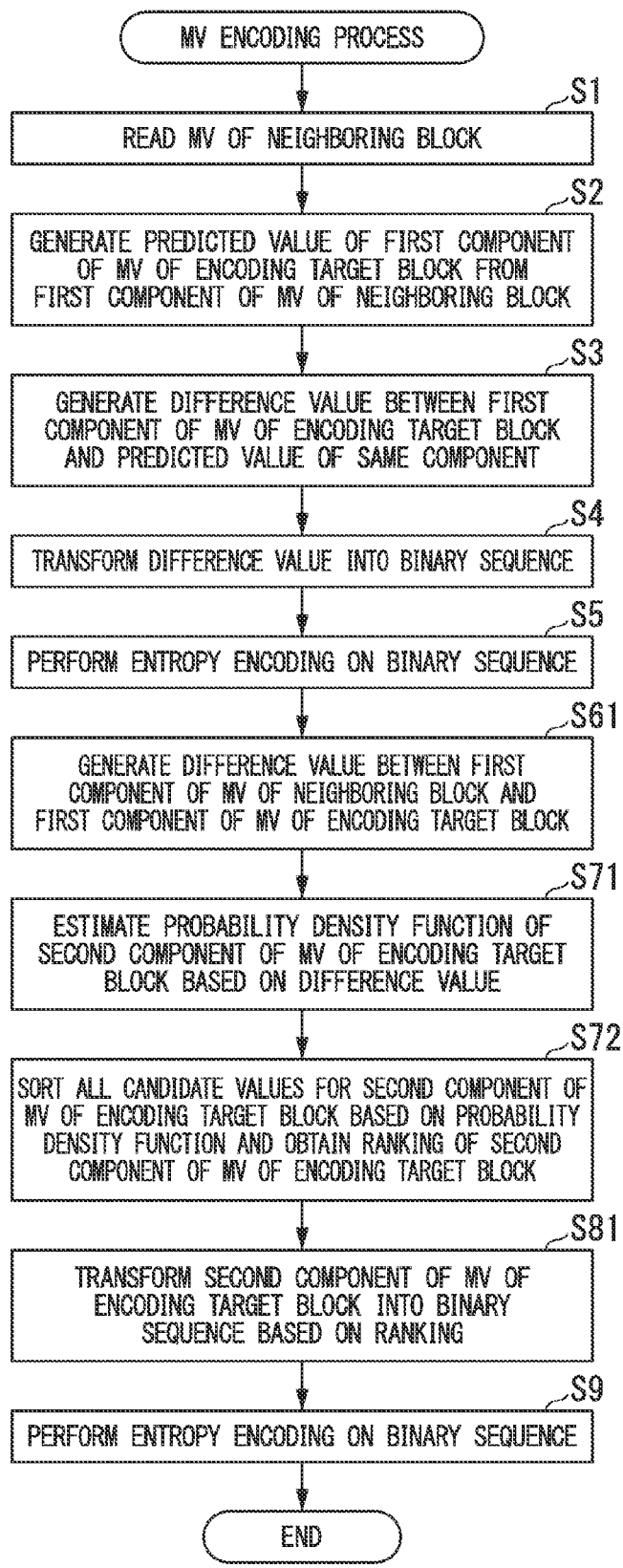
FIG. 6 is a flowchart illustrating a processing operation of a vector prediction unit illustrated in FIG. 5.

Next, a processing operation of the vector prediction unit 30 illustrated in FIG. 5 will be described with reference to FIG. 6. FIG. 6 is a flowchart illustrating the processing operation of the vector prediction unit 30 illustrated in FIG. 5. First, the predicted value generation unit 103 reads a MV of a designated neighboring block (step S1), and generates a predicted value for the first component of the MV of the encoding target block from the first component of the MV of the neighboring block (step S2). A predicted value generation method is assumed to be given in advance. For example, it is possible to apply the above-described spatial median prediction.

Next, the difference value generation unit 104 generates a difference value between two from the first component of the MV of the encoding target block and the predicted value of the same component (step S3). Subsequently, the binary transform unit 105 transforms the generated difference value into a binary sequence (step S4). A specific transform into the binary sequence is assumed to be given during encoding. For example, a Golomb code or an Exp-Golomb code is used. The entropy encoding unit 106 performs entropy encoding on the binary sequence and outputs a result of the entropy encoding (step S5). Specific entropy encoding is assumed to be given during encoding. For example, CABAC adopted in H.264/AVC is used.

In parallel with this operation, the difference value generation unit 111 for the first component reads the first component of the MV of each block designated as a neighboring block and the first component of the MV of the encoding target block, and outputs a first component difference value of the MV of each neighboring block for the MV of the encoding target block (step S61). Subsequently, the probability density function estimation unit 112 of the second component receives inputs of a first component difference value $e_x^{(m)}$ of the MV of each neighboring block and a second component $u_y^{(m)}$ (m=0, . . . , M−1) of the MV of each neighboring block, and outputs a probability density function of the second component of the MV of the encoding target block according to Expression (1) (step S71). Parameters q and λ used to prescribe a generalized Gaussian distribution are assumed to be given from the outside.

Next, the binary transform map generation unit 113 receives an input of the output probability density function, sorts candidate values for the second component of the MV of the encoding target block in descending order according to a probability of occurrence using the same probability density function, and obtains rankings within all candidate vectors for the second component of the MV of the encoding target block (step S72). Accordingly, the binary transform unit 109 transforms the same second component into a binary number based on the second component of the MV of the encoding target block and the rankings obtained for the same second component (step S81). Specific allocation of the binary sequence for a value after sorting is assumed to be given during encoding. For example, a Golomb code or an Exp-Golomb code is used. The entropy encoding unit 110 performs entropy encoding on the binary sequence and outputs a result of the entropy encoding (step S9).

Figure 7:
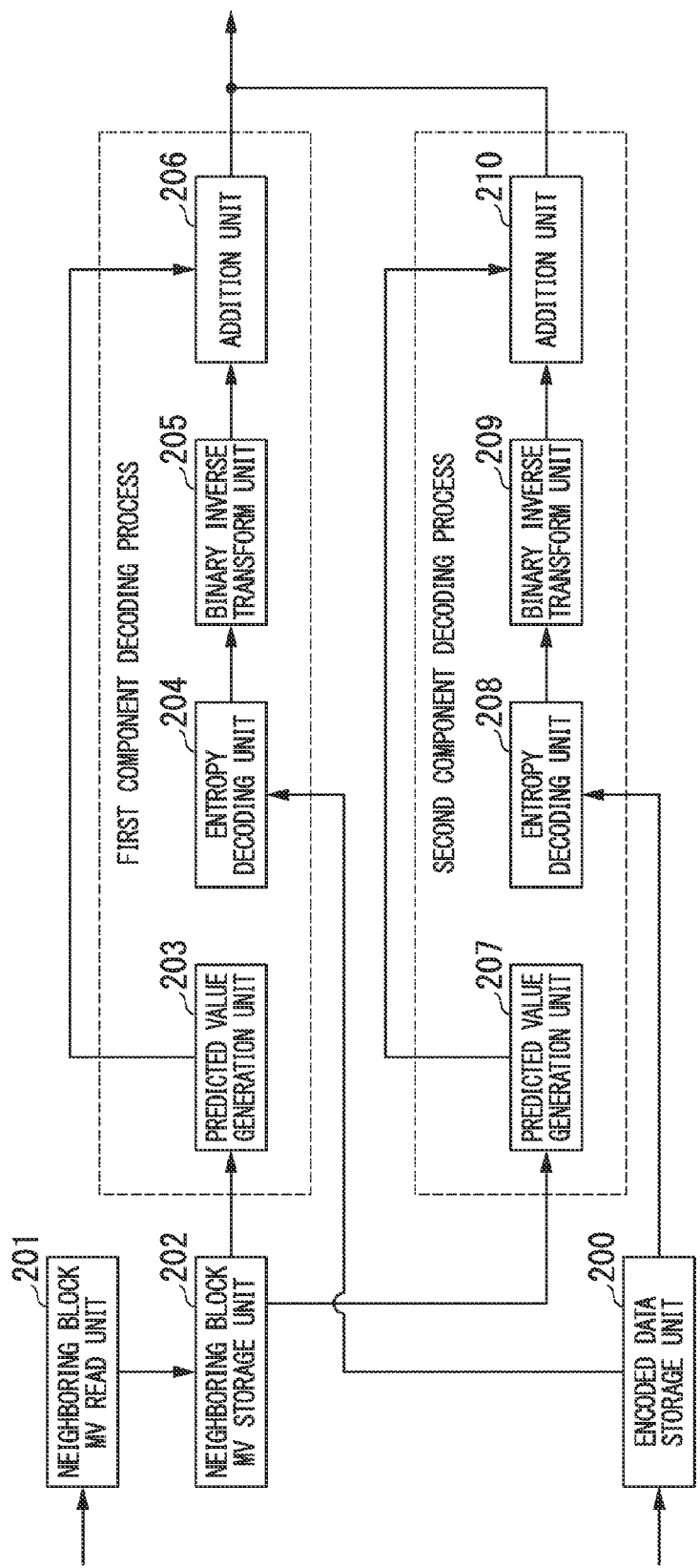
FIG. 7 is a block diagram illustrating a configuration of a MV prediction unit illustrated in FIG. 2.

Next, a configuration of the MV prediction unit 28 illustrated in FIG. 2 will be described with reference to FIG. 7. FIG. 7 is a block diagram illustrating the configuration of the MV prediction unit 28 illustrated in FIG. 2. In FIG. 7, reference sign 201 represents a neighboring block MV read unit which reads a MV of a designated neighboring block. A neighboring block MV storage unit 202 stores the read MV of the neighboring block. A predicted value generation unit 203 receives an input of the first component of the MV of the neighboring block stored in the neighboring block MV storage unit 202 and generates a predicted value for the first component of the MV of the decoding target block. A predicted value generation method is assumed to be given in advance. For example, it is possible to apply the above-described spatial median prediction.

An entropy decoding unit 204 receives an input of encoded data associated with the first component of the MV stored in an encoded data storage unit 200, performs an entropy decoding process, and generates a binary sequence. A specific entropy decoding process is assumed to be given during decoding. For example, CABAC adopted in H.264/AVC is used. A binary inverse transform unit 205 transforms an output binary sequence into a first component difference value. An addition unit 206 receives inputs of the output binary sequence and a predicted value output from a predicted value generation unit 203, adds the two, and outputs the first component of the MV.

A predicted value generation unit 207 receives an input of the second component of the MV of the neighboring block stored in the neighboring block MV storage unit 202 and generates a predicted value for the second component of the MV of the decoding target block. A predicted value generation method is assumed to be given in advance. For example, it is possible to apply the above-described spatial median prediction.

An entropy decoding unit 208 receives an input of encoded data associated with the second component of the MV stored in the encoded data storage unit 200, performs an entropy decoding process, and generates a binary sequence. A specific entropy decoding process is assumed to be given during decoding. For example, CABAC adopted in H.264/AVC is used. A binary inverse transform unit 209 transforms an output binary sequence into a second component difference value. An addition unit 210 receives inputs of the output binary sequence and a predicted value output from the predicted value generation unit 207, adds the two, and outputs the second component of the MV.

Figure 8:
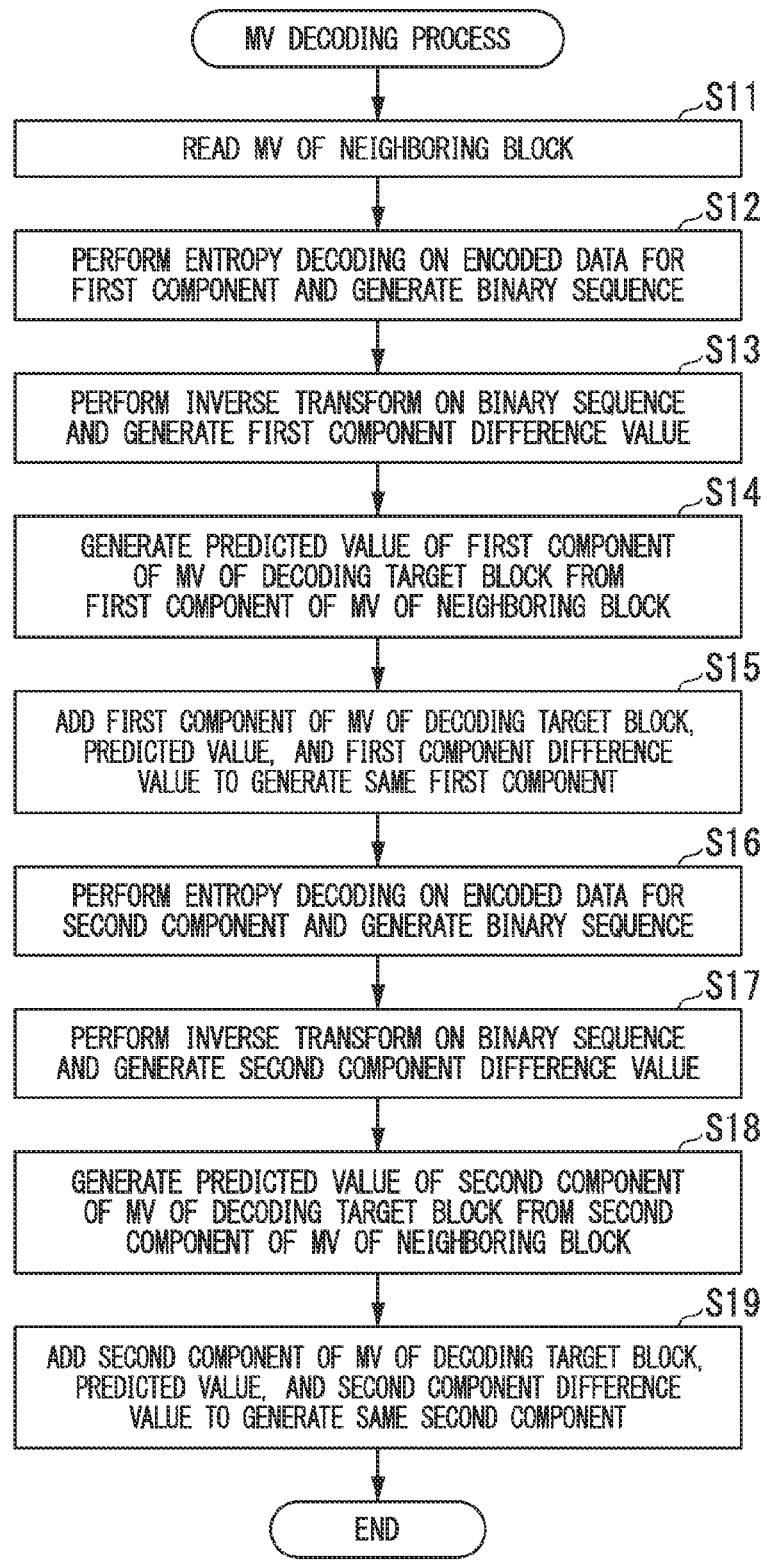
FIG. 8 is a flowchart illustrating a processing operation of a vector prediction unit illustrated in FIG. 7.

Next, a processing operation of the MV prediction unit 28 illustrated in FIG. 7 will be described with reference to FIG. 8. FIG. 8 is a flowchart illustrating the processing operation of the MV prediction unit 28 illustrated in FIG. 7. First, the predicted value generation unit 203 reads a MV of a designated neighboring block (step S11). The entropy decoding unit 204 receives an input of encoded data associated with the MV of the first component, performs an entropy decoding process, and generates and outputs a binary sequence (step S12). A specific entropy decoding process is assumed to be given during decoding. For example, CABAC adopted in H.264/AVC is used.

Next, the binary inverse transform unit 205 inversely transforms the binary sequence to output a first component difference value (step S13). A specific inverse transform of the binary sequence is assumed to be separately given. For example, a code table of a Golomb code or an Exp-Golomb code is used. Subsequently, the predicted value generation unit 203 generates a predicted value for the first component of the MV of the decoding target block from the first component of the MV of the neighboring block (step S14). A predicted value generation method is assumed to be given in advance. For example, it is possible to apply the above-described spatial median prediction. The addition unit 206 receives inputs of the output first component difference value and the output predicted value, adds the two, and outputs an addition value as the first component of the MV of a decoding target block (step S15).

In parallel with this operation, the predicted value generation unit 207 reads the MV of the designated neighboring block (step S11). The entropy decoding unit 208 receives an input of encoded data associated with the MV of the second component, performs an entropy decoding process, and generates and outputs a binary sequence (step S16). A specific entropy decoding process is assumed to be given during decoding. For example, CABAC adopted in H.264/AVC is used.

Next, the binary inverse transform unit 209 inversely transforms the binary sequence to output a second component difference value (step S17). A specific inverse transform of the binary sequence is assumed to be separately given. For example, a code table of a Golomb code or an Exp-Golomb code is used. Subsequently, the predicted value generation unit 207 generates a predicted value for the second component of the MV of the decoding target block from the second component of the MV of the neighboring block (step S18). A predicted value generation method is assumed to be given in advance. For example, it is possible to apply the above-described spatial median prediction. Accordingly, the addition unit 210 receives inputs of the output binary sequence and the output predicted value, adds the two, and outputs an addition value as the second component of the MV of a decoding target block (step S19).

Figure 9:
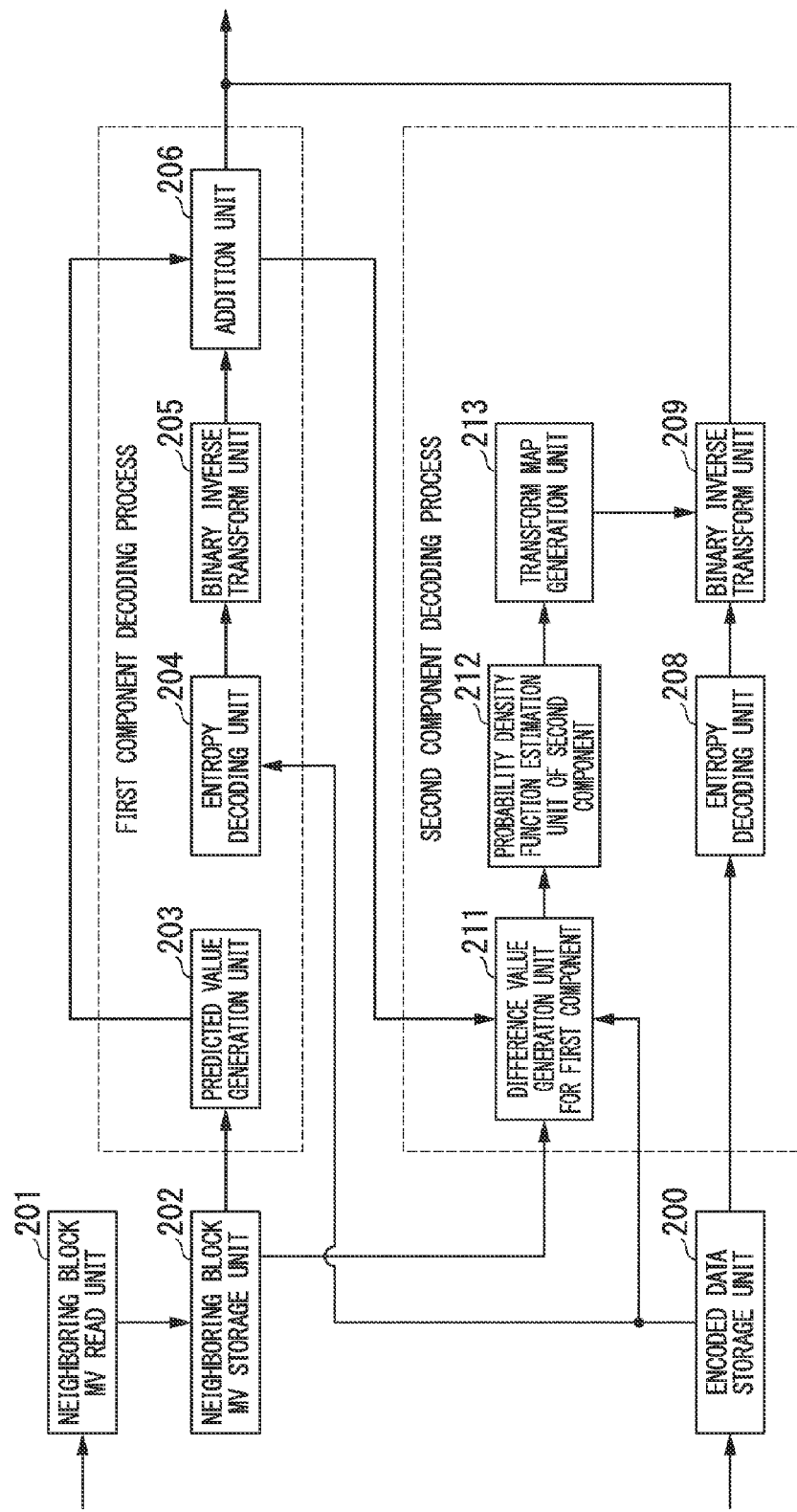
FIG. 9 is a block diagram illustrating a configuration produced by modifying the vector prediction unit illustrated in FIG. 7.

Next, a configuration produced by modifying the vector prediction unit 28 illustrated in FIG. 7 will be described with reference to FIG. 9. FIG. 9 is a block diagram illustrating the configuration produced by modifying the vector prediction unit 28 illustrated in FIG. 7.

The same parts as those of the device illustrated in FIG. 7 are assigned the same reference signs in FIG. 9, and description thereof is omitted. The device illustrated in FIG. 9 is different from the device illustrated in FIG. 7 in that a difference value generation unit 211 for the first component, a probability density function estimation unit 212 of the second component, and a transform map generation unit 213 are provided.

The difference value generation unit 211 for the first component receives inputs of the first component of the MV of each neighboring block stored in the neighboring block MV storage unit 202 and the first component of the MV of the decoding target block stored in the encoded data storage unit 200, and outputs a first component difference value of the MV of each neighboring block for the MV of the decoding target block. The probability density function estimation unit 212 of the second component receives inputs of the first component difference value of the MV of each neighboring block and the second component of the MV of each neighboring block, and outputs a probability density function of the second component of the MV of the decoding target block according to Expression (1). In addition, parameters q and X used to prescribe a generalized Gaussian distribution are assumed to be given from the outside.

The transform map generation unit 213 receives an input of the output probability density function, sorts candidate values for the second component of the MV of the decoding target block in descending order according to the probability of occurrence using the same probability density function, and obtains rankings of candidate values for the same second component and a correspondence relationship (transform map) of the same second component.

The entropy decoding unit 208 receives an input of encoded data associated with the second component of the MV stored in the encoded data storage unit 200, performs an entropy decoding process, and generates a binary sequence. A specific entropy decoding process is assumed to be given during decoding. For example, CABAC adopted in H.264/AVC is used. The binary inverse transform unit 209 inversely transforms a binary sequence associated with the same output second component, and calculates rankings of all candidate vectors for the second component of the MV of the decoding target block. This inverse transform is implemented using reverse lookup of a code table (for example, a Golomb code or an Exp-Golomb code) used during encoding. Further, information of the same ranking is transformed into the second component of the MV of the decoding target block using the same calculated ranking and the transform map as the input.

Next, a processing operation of the vector prediction unit 28 illustrated in FIG. 9 will be described with reference to FIG. 10.

Figure 10:
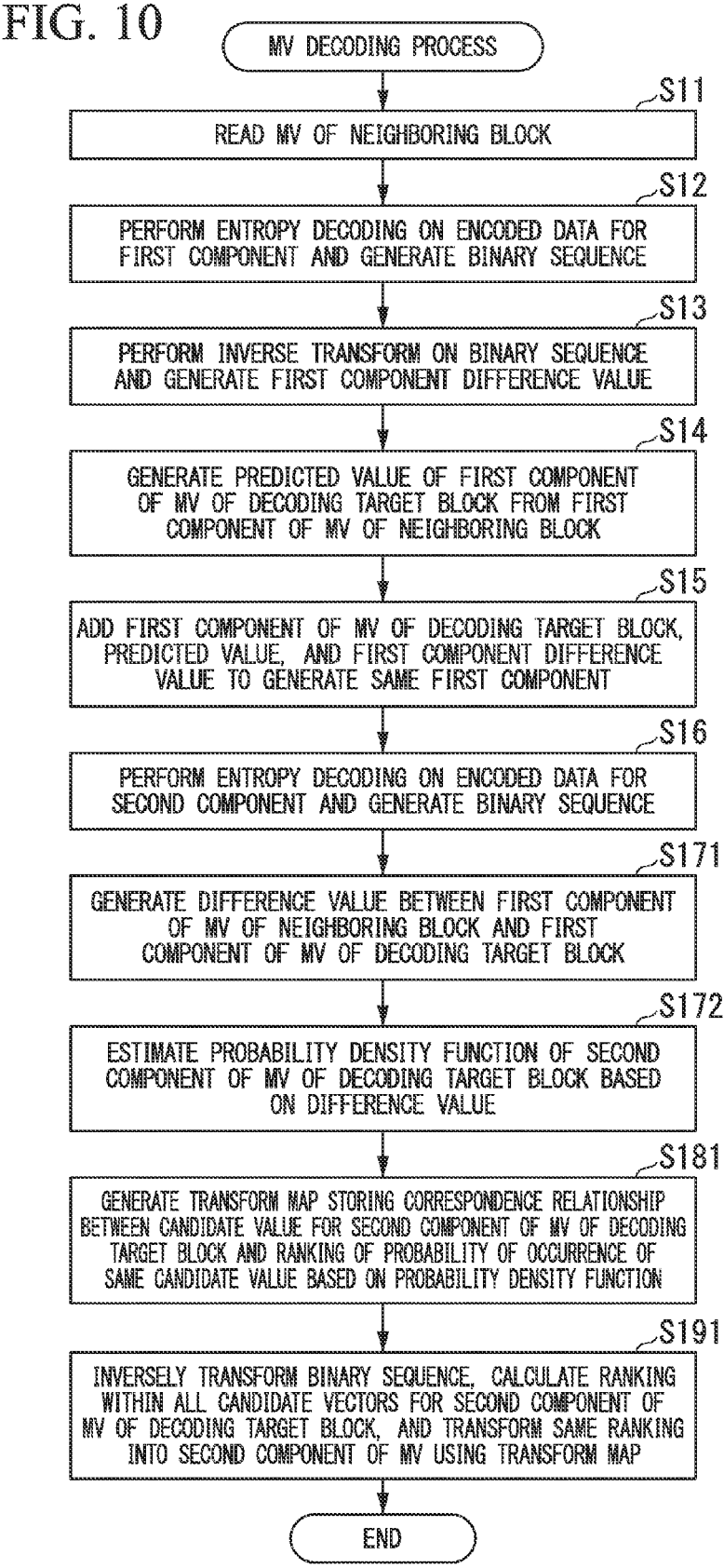
FIG. 10 is a flowchart illustrating a processing operation of a vector prediction unit illustrated in FIG. 9.

FIG. 10 is a flowchart illustrating a processing operation of the vector prediction unit 28 illustrated in FIG. 9.

First, the predicted value generation unit 203 reads a MV of a designated neighboring block (step S11). The entropy decoding unit 204 receives an input of encoded data associated with the MV of the first component, performs an entropy decoding process, and generates and outputs a binary sequence (step S12). A specific entropy decoding process is assumed to be given during decoding. For example, CABAC adopted in H.264/AVC is used.

Next, the binary inverse transform unit 205 inversely transforms the binary sequence to output a first component difference value (step S13). A specific inverse transform of the binary sequence is assumed to be separately given. For example, a code table of a Golomb code or an Exp-Golomb code is used. Subsequently, the predicted value generation unit 203 generates a predicted value for the first component of the MV of the decoding target block from the first component of the MV of the neighboring block (step S14). A predicted value generation method is assumed to be given in advance. For example, it is possible to apply the above-described spatial median prediction. The addition unit 206 receives inputs of the output first component difference value and the output predicted value, adds the two, and outputs an addition value as the first component of the MV of a decoding target block (step S15).

In parallel with this operation, the entropy decoding unit 208 receives encoded data associated with the MV of the second component, performs an entropy decoding process, and outputs a binary sequence (step S16). The difference value generation unit 211 for the first component receives inputs of the first component of the MV of each block designated as a neighboring block and the first component of the MV of the decoding target block, and outputs a first component difference value of the MV of each neighboring block for the MV of the decoding target block (step S171).

Next, the probability density function estimation unit 212 of the second component receives inputs of the output difference value and the second component of the MV of each neighboring block, and estimates and outputs a probability density function of the second component of the MV of the decoding target block according to Expression (1) (step S172). In addition, parameters q and X used to prescribe a generalized Gaussian distribution are assumed to be given from the outside. Subsequently, the transform map generation unit 213 sorts candidate values for the second component of the MV of the decoding target block in descending order according to a probability of occurrence using the output probability density function, and generates rankings of candidate values for the same second component and a correspondence relationship (transform map) of the same second component (step S181).

Next, the binary inverse transform unit 209 inversely transforms a binary sequence associated with the same second component output in step S16, and calculates rankings of all candidate vectors for the second component of the MV of the decoding target block. This inverse transform is implemented using reverse lookup of a code table (for example, a Golomb code or an Exp-Golomb code) used during encoding. Further, information of the same ranking is transformed into the second component of the MV of the decoding target block using the same calculated ranking and the transform map as the input (step S191).

Figure 12:
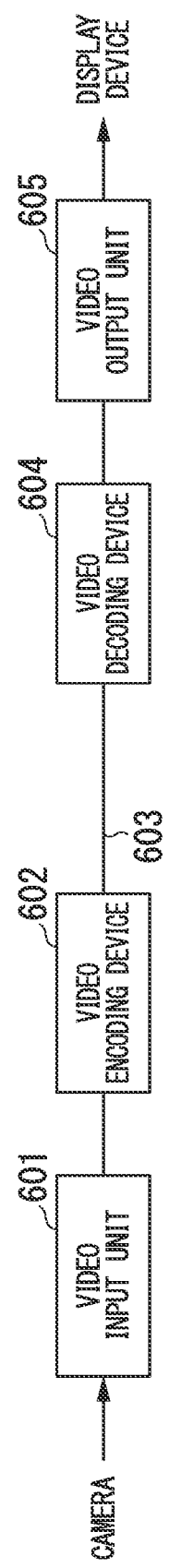
FIG. 12 is a block diagram illustrating a configuration of an image transmission system.
Figure 13:
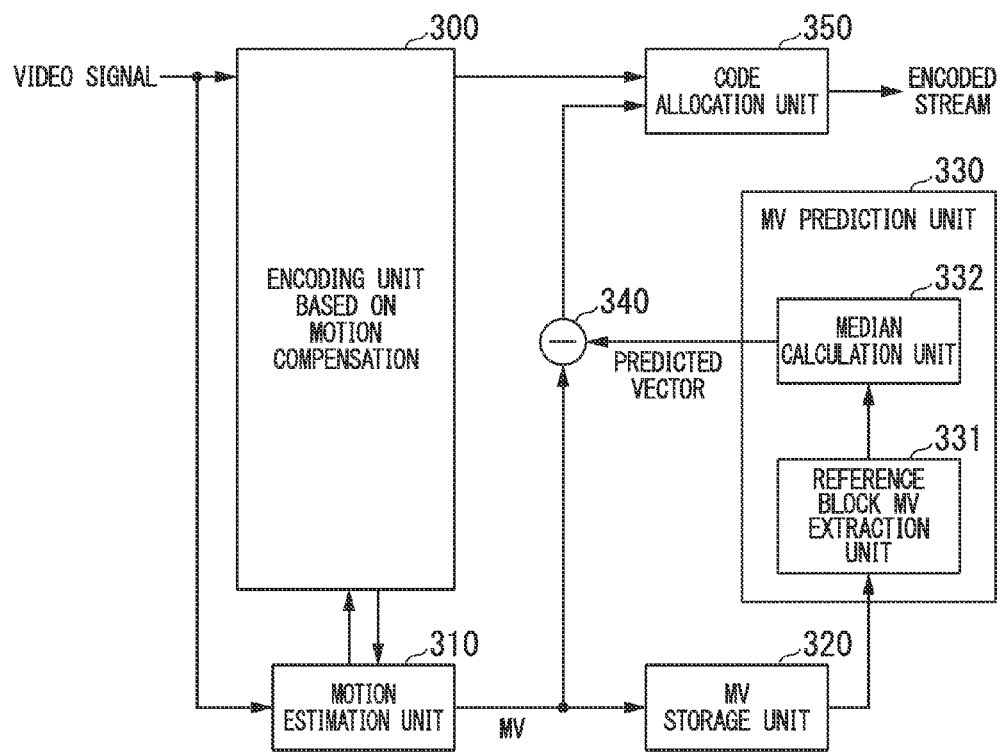
FIG. 13 is a block diagram illustrating a configuration of a video encoding device using motion compensation according to the related art.
Figure 14:
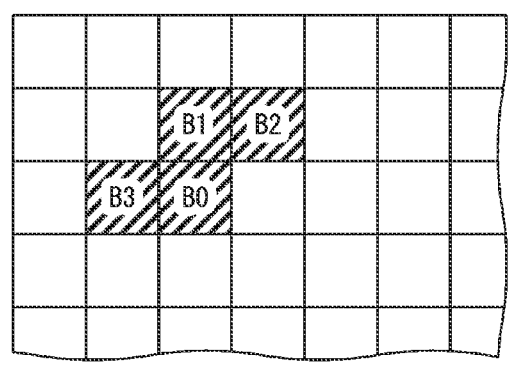
FIG. 14 is an explanatory diagram illustrating an example of a prediction target block of an encoding target image.
Figure 15:
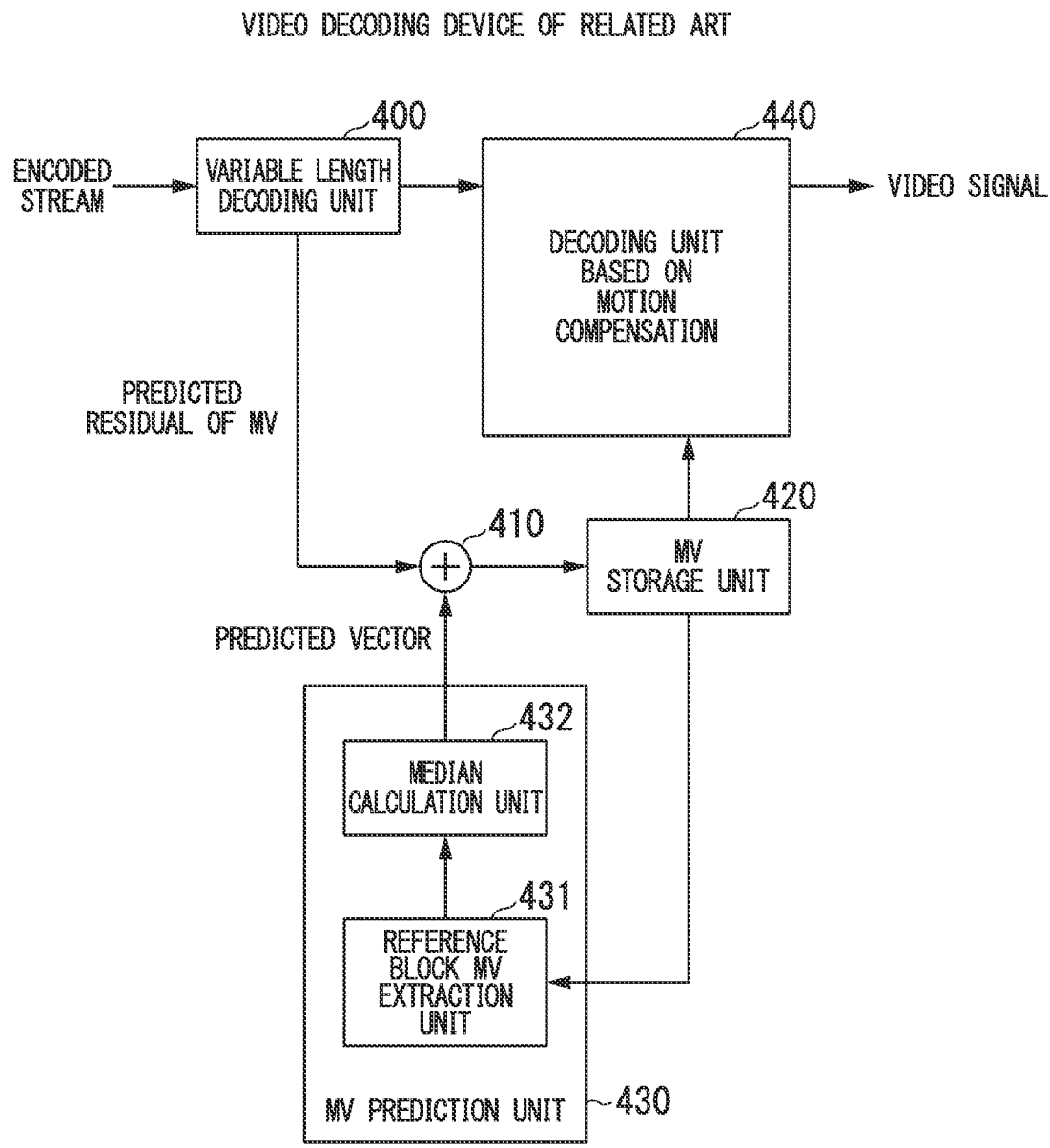
FIG. 15 is a block diagram illustrating a configuration of a video decoding apparatus using motion compensation according to the related art.
Figure 16:
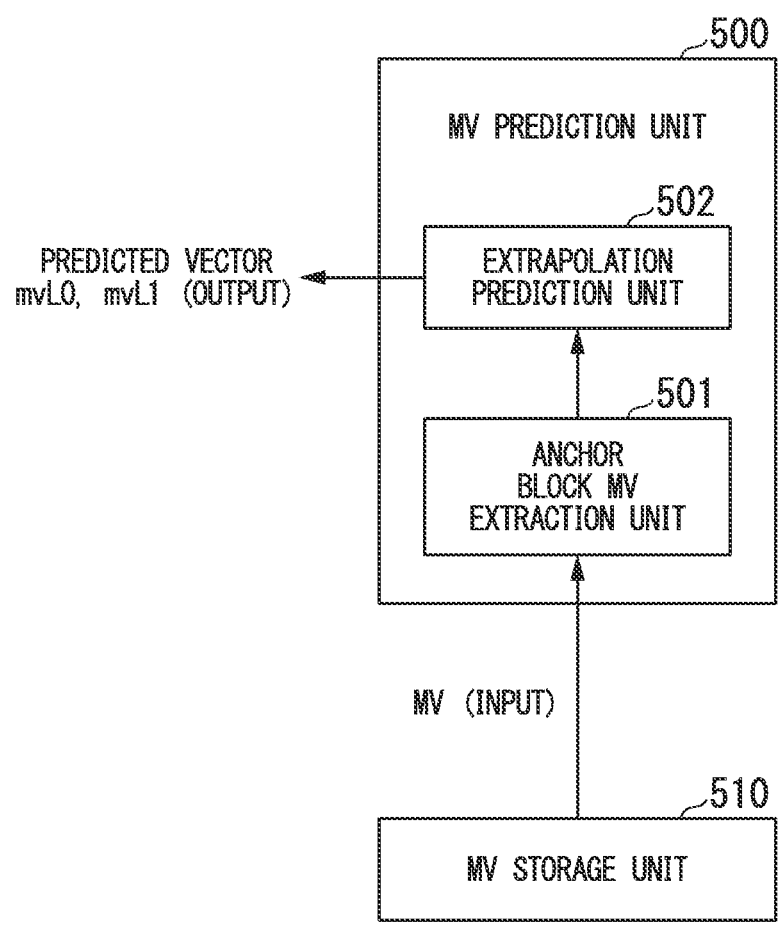
FIG. 16 is a block diagram illustrating a configuration of a time direction MV prediction unit of the related art.

Next, a configuration of an image transmission system including the video encoding device and the video decoding device illustrated in FIGS. 1 and 2 will be described with reference to FIG. 12. FIG. 12 is a block diagram illustrating the configuration of the image transmission system. In FIG. 12, a video input unit 601 receives an input of a video captured by a camera or the like. A video encoding device 602 includes the video encoding device illustrated in FIG. 1 and encodes the video input by the video input unit 601 to transmit the encoded video. A transmission path 603 transmits data of the encoded video transmitted from the video encoding device 602. A video decoding device 604 includes the video decoding device illustrated in FIG. 2, receives data of the encoded video transmitted through the transmission path 603, and decodes the data of the encoded video to output the decoded data. A video output unit 605 outputs a video decoded in the video decoding device 604 to a display device or the like.

Next, an operation of the image transmission system illustrated in FIG. 12 will be described. The video encoding device 602 receives an input of data of a video via the video input unit 601, and encodes the data through the above-described processing operation for every frame of the video. Accordingly, the video encoding device 602 transmits the encoded video data to the video decoding device 604 via the transmission path 603. The video decoding device 604 decodes the encoded video data through the above-described processing operation and displays a video on the display device or the like via the video output unit 605.

Because a second component is encoded using a first component value of a MV as described above, it is possible to reduce a bit amount of a second component value and reduce a generated encoding bit amount in a video encoding process.

In addition, the video encoding process and the video decoding process may be performed by recording a program used to implement the functions of the processing units in FIG. 1 on a computer-readable recording medium and causing a computer system to read and execute the program recorded on the recording medium.

The "computer system" used herein may include an operating system (OS) and/or hardware such as peripheral devices. In addition, the "computer system" is also assumed to include a World Wide Web (WWW) system having a home page providing environment (or display environment). In addition, the "computer-readable recording medium" refers to a storage device including a flexible disk, a magneto-optical disc, a read only memory (ROM), a portable medium such as a compact disc-ROM (CD-ROM), and a hard disk embedded in the computer system. Further, it is assumed that the "computer-readable recording medium" includes a medium used to store programs for a fixed period of time like a volatile memory (RAM) inside a computer system including a server and a client when a program is transmitted via a network such as the Internet or a communication line such as a telephone line.

In addition, the above-described program may be transmitted from a computer system storing the program in a storage device or the like to other computer systems via a transmission medium or transmission waves of the transmission medium. Here, the "transmission medium" used to transmit the program refers to a medium having a function of transmitting information like a network (communication network) such as the Internet or a communication line (communication wire) such as a telephone line. The above-described program may be used to implement some of the above-described functions. Further, the program may be a so-called differential file (differential program) capable of implementing the above-described functions through combination with a program already recorded on the computer system.

INDUSTRIAL APPLICABILITY

The video encoding device related to the present invention is applicable for the purpose of improving encoding efficiency of a MV and further reducing a bit amount of a MV than in the related art.

DESCRIPTION OF REFERENCE SYMBOLS

1 Video encoding device
2 Video decoding device
100 Encoding target block MV storage unit
101 Neighboring block MV read unit
102 Neighboring block MV storage unit
103 Predicted value generation unit
104 Difference value generation unit
105 Binary transform unit
106 Entropy encoding unit
109 Binary transform unit
110 Entropy encoding unit
111 Difference value generation unit for first component
112 Probability density function estimation unit of second component
113 Binary transform map generation unit
200 Encoded data storage unit
201 Neighboring block MV read unit
202 Neighboring block MV storage unit
203 Predicted value generation unit
204 Entropy decoding unit
205 Binary inverse transform unit
206 Addition unit
208 Entropy decoding unit
209 Binary inverse transform unit
211 Difference value generation unit for first component
212 Probability density function estimation unit of second component
213 Transform map generation unit

The invention claimed is:

1. A video encoding device using motion-compensated inter-frame prediction for each block by dividing an image into blocks each having a predetermined size, designating one component value of a plurality of component values of a motion vector (MV) between an encoding target block and a neighboring block as a first component value, designating another component value as a second component value, and encoding each of the first component value and the second component value, the video encoding device comprising:

a first component encoding circuit which obtains a difference value of a first component, which is a difference value between a predicted value of the first component value of the MV of the encoding target block generated from the first component value of the MV of the neighboring block and the first component value of the MV of the encoding target block, and encodes the obtained difference value of the first component; and a second component encoding circuit which obtains a probability of occurrence of a candidate value for a second component value of the MV of the encoding target block based on a first difference value between the first component value of the MV of the neighboring block and the first component value of the MV of the encoding target block, and also based on the second component value of the MV of the neighboring block, specifies a codeword of the second component value based on the occurrence probability, and encodes the second component value, wherein the second component encoding circuit estimates the occurrence probability using similarity between (1) the first difference value and (2) a second difference value between the second component value of the MV of the neighboring block and the second component value of the MV of the encoding target block.

2. A video decoding device which decodes an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, the video decoding device comprising:

a first component decoding circuit which generates the first component value by decoding a difference value of a first component and adding a predicted value of the first component value of the MV of the encoding target block generated from the first component value of the MV of the neighboring block to the difference value of the first component; and a second component decoding circuit which obtains a probability of occurrence of a candidate value for the second component value of the MV of the encoding target block based on a first difference value between the first component value of the MV of the neighboring block and the first component value of the MV of the encoding target block, and also based on the second component value of the MV of the neighboring block, identifies a correspondence relationship between the second component value and a codeword of the second component value based on the occurrence probability, and decodes the codeword of the second component value given as encoded data to the second component value, wherein the second component decoding circuit estimates the occurrence probability using similarity between (1) the first difference value and (2) a second difference value between the second component value of the MV of the neighboring block and the second component value of the MV of the encoding target block.

3. A video encoding method using motion-compensated inter-frame prediction for each block by dividing an image into blocks each having a predetermined size, designating one component value of a plurality of component values of a MV between an encoding target block and a neighboring block as a first component value, designating another component value as a second component value, and encoding each of the first component value and the second component value, the video encoding method comprising:

a first component encoding step of obtaining a difference value of a first component, which is a difference value between a predicted value of the first component value of the MV of the encoding target block generated from the first component value of the MV of the neighboring block and the first component value of the MV of the encoding target block, and encoding the difference value of the first component; and a second component encoding step of obtaining a probability of occurrence of a candidate value for a second component value of the MV of the encoding target block based on a first difference value between the first component value of the MV of the neighboring block and the first component value of the MV of the encoding target block, and also based on the second component value of the MV of the neighboring block, specifying a codeword of the second component value based on the occurrence probability, and encoding the second component value, wherein the second component encoding step estimates the occurrence probability using similarity between (1) the first difference value and (2) a second difference value between the second component value of the MV of the neighboring block and the second component value of the MV of the encoding target block.

4. A video decoding method of decoding an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, the video decoding method comprising:

a first component decoding step of generating the first component value by decoding a difference value of a first component and adding a predicted value of the first component value of the MV of the encoding target block generated from the first component value of the MV of the neighboring block to the difference value of the first component; and a second component decoding step of obtaining a probability of occurrence of a candidate value for the second component value of the MV of the encoding target block based on a first difference value between the first component value of the MV of the neighboring block and the first component value of the MV of the encoding target block, and also based on the second component value of the MV of the neighboring block, identifying a correspondence relationship between the second component value and a codeword of the second component value based on the occurrence probability, and decoding the codeword of the second component value given as encoded data to the second component value, wherein the second component decoding step estimates the occurrence probability using similarity between (1) the first difference value and (2) a second difference value between the second component value of the MV of the neighboring block and the second component value of the MV of the encoding target block.

5. A non-transitory computer-readable recording medium storing a video encoding program used to cause a computer on a video encoding device, which uses motion-compensated inter-frame prediction for each block by dividing an image into blocks each having a predetermined size, designating one component value of a plurality of component values of a MV between an encoding target block and a neighboring block as a first component value, designating another component value as a second component value, and encoding each of the first component value and the second component value, to perform an image encoding process comprising:

a first component encoding step of obtaining a difference value of a first component, which is a difference value between a predicted value of the first component value of the MV of the encoding target block generated from the first component value of the MV of the neighboring block and the first component value of the MV of the encoding target block, and encoding the difference value of the first component; and a second component encoding step of obtaining a probability of occurrence of a candidate value for a second component value of the MV of the encoding target block based on a first difference value between the first component value of the MV of the neighboring block and the first component value of the MV of the encoding target block, and also based on the second component value of the MV of the neighboring block, specifying a codeword of the second component value based on the occurrence probability, and encoding the second component value, wherein the second component encoding step estimates the occurrence probability using similarity between (1) the first difference value and (2) a second difference value between the second component value of the MV of the neighboring block and the second component value of the MV of the encoding target block.

6. A non-transitory computer-readable recording medium storing a video decoding program used to cause a computer on a video decoding device which decodes an image encoded using motion-compensated inter-frame prediction for each block by dividing the image into blocks each having a predetermined size, designating one component value of a plurality of component values of a MV between an encoding target block and a neighboring block as a first component value, designating another component value as a second component value, and encoding each of the first component value and the second component value, to perform a video decoding process comprising:
- a first component decoding step of generating the first component value by decoding a difference value of a first component and adding a predicted value of the first component value of the MV of the encoding target block generated from the first component value of the MV of the neighboring block to the difference value of the first component; and
- a second component decoding step of obtaining a probability of occurrence of a candidate value for the second component value of the MV of the encoding target block based on a first difference value between the first component value of the MV of the neighboring block and the first component value of the MV of the encoding target block, and also based on the second component value of the MV of the neighboring block, identifying a correspondence relationship between the second component value and a codeword of the second component value based on the occurrence probability, and decoding the codeword of the second component value given as encoded data to the second component value,
- wherein the second component decoding step estimates the occurrence probability using similarity between (1) the first difference value and (2) a second difference value between the second component value of the MV of the neighboring block and the second component value of the MV of the encoding target block.

* * * * *